Jan. 26, 1943.   J. L. PERKINS   2,309,530
APPARATUS FOR FORMING GEAR TEETH
Filed Dec. 20, 1940
Fig.1.
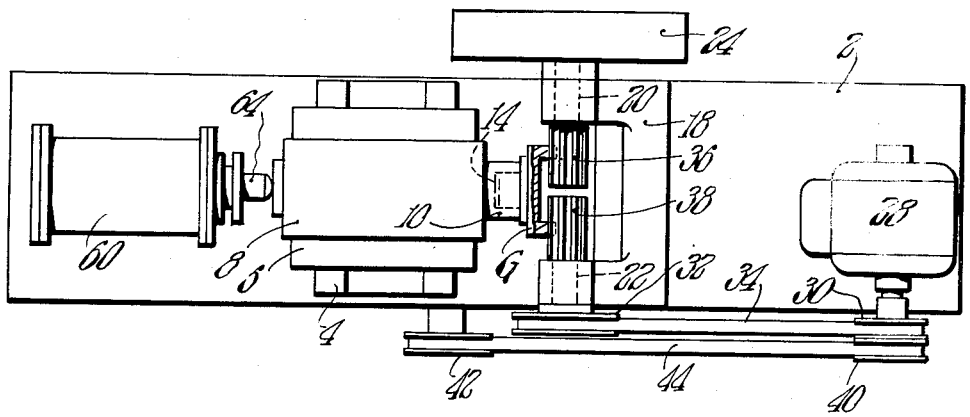
Fig.2.
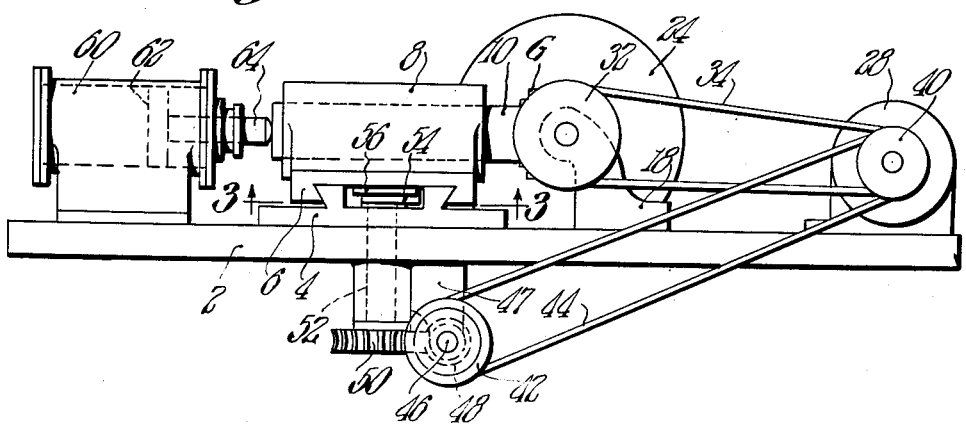
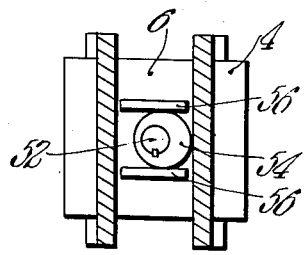
Fig.3.
INVENTOR.
Julian L. Perkins.
BY Walter C. Ross, Attorney.

UNITED STATES PATENT OFFICE 2,309,530

APPARATUS FOR FORMING GEAR TEETH

Julian L. Perkins, West Springfield, Mass., assignor to Perkins Machine and Gear Company, West Springfield, Mass., a corporation of Massachusetts Application December 20, 1940, Serial No. 370,996

5 Claims. (Cl. 29—90)

This invention relates to improvements in machines for forming the teeth of gears.

The principal objects of the invention are directed to improvements in machines for forming the teeth of gears and is directed more particularly to improvements in apparatus for forming the teeth of gears in which the teeth are disposed so as to extend transversely of the gear's axis of rotation as in a face gear where the said teeth are disposed on or are carried by a face that is transverse to the axis of rotation of the gear.

As special features of the invention, apparatus is provided wherein preformed teeth or roughly formed gear teeth are acted upon by pinion tools in such a way that the gear teeth are worked on or are generated in such a way so as to fit and operate with the teeth of a pinion.

With the foregoing and various other novel features and advantages and other objects of my invention as will become more apparent as the description proceeds, the invention consists, in certain novel features of construction and in the combination and arrangement of parts as will be hereinafter more particularly pointed out in the claims hereunto annexed and more fully described and referred to in connection with the accompanying drawing wherein:

Fig. 1 is a plan view of a machine embodying the novel features of the invention;

Fig. 2 is a side elevational view of the machine shown in Fig. 1; and

Fig. 3 is an inverted plan view on the line 3—3 of Fig. 2.

Referring now to the drawing more in detail, wherein similar reference figures refer to like parts, and referring more particularly to the preferred form of my invention which has been selected for illustrative purposes, I have shown a base, represented by 2, which carries a member 4. A slide 6 is reciprocable transversely of the member 4 and it has a bearing 8 in which is longitudinally slidable a member 10 that may be called a work carrier.

A gear G which may be of the face gear type is supported for rotation in the forward end of the carrier 10. This may be accomplished in various ways as by providing a socket 14 in the forward end of member 10 which may receive a hub of said gear, as shown in Fig. 1. The invention relates to the forming or finishing of the teeth of such a gear as G.

A bearing member 18 carried by the bed has aligned shafts 20 and 22 rotatable therein. The shaft 20 has a fly wheel 24 fixed thereto. The shaft 22 is driven by means of a motor 28 connected to said shaft by through pulleys 30, 32 and a belt 34. Pinions 36 and 38 are fixed to the shafts 20 and 22.

The gear G has its teeth in meshing engagement with the teeth of pinions 36 and 38. The teeth at one side of said gear mesh with the teeth of one pinion while the teeth at the opposite side of the gear mesh with the teeth of the other pinion.

The teeth of the gear G are roughly formed as with the case of cast or forged gears and by means of the invention the gear teeth are formed to fit or coact with the teeth of a pinion or pinions by being acted upon by the teeth of pinions 36 and 38.

To accomplish this the gear G is pressed forwardly relative to the pinions 36 and 38. The pinion 38 is rotated so as to rotate gear G which in turn rotates the pinion 36. While pressure is applied to the gear, the member 6 is moved back and forth so that the gear G moves axially of or traverses the pinions.

The slide 6 is reciprocated by the following means. A shaft 46 rotatable in a bracket 47 is rotated from motor 28 by means of pulleys 40, 42 and belt 44. A worm 48 on shaft 46 is in mesh with a worm 50 of a rotatable shaft 52 the upper end of which carries a cam 54 disposed between abutments 56 on the underside of slide 6.

The carrier 10 is acted upon by a plunger 64 associated with a piston 62 reciprocable in a cylinder. By admitting fluid to said cylinder at the rear of the piston the plunger may be caused to press on the carrier 10 with any desired degree of pressure. Any other means desired may be employed to apply pressure to the carrier.

In operation the gear G is formed into meshing engagement with the pinions and is caused to traverse said pinions while it is rotated by one pinion and it in turn rotates the other pinion. The action is such that the preformed teeth of the gear or the teeth thereof which are formed to some extent and require finishing are formed to the desired shape. In some cases, depending on the metal from which the gear teeth are formed, the said teeth are shaped by an abrasive or cutting action; in other cases there is a displacement of the metal and in other cases there is both an abrasive and displacing action.

Preferably the teeth of the pinions will have the tooth characteristics of the pinion with which the gear G is to operate so as to provide the most perfect tooth form. The two pinions 36 and 38 arranged for independently engaging the gear G is desired since with an even number of teeth in gear G the teeth at opposite sides may not be exactly in alignment and it is possible to operate on the teeth at the opposite sides of the gear simultaneously.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A machine for finishing the teeth of a face gear comprising in combination, a pair of aligned independently rotatable pinions, means for rotatably supporting a gear to be finished on an axis transverse to that of the pinions with the teeth thereof in meshing engagement with the teeth of said pinions, and means for urging said gear supporting means towards said pinions.

2. A machine for finishing the teeth of a face gear comprising in combination, a pair of aligned independently rotatable pinions, means for rotatably supporting a gear to be finished on an axis transverse to that of the pinions with the teeth thereof in meshing engagement with the teeth of said pinions, means for urging said gear supporting means towards said pinions, and means for moving said means for supporting the gear to cause the teeth of said gear to move axially of said pinions.

3. A machine for finishing the teeth of a face gear comprising in combination, a pair of aligned independently rotatable pinions, means for rotatably supporting a gear to be finished on an axis transverse to that of the pinions with the teeth thereof in meshing engagement with the teeth of said pinions, means for urging said gear towards said pinions, means for moving said means for supporting the gear to cause the teeth of said gear to move axially of said pinion, and means to rotate one of said pinions whereby a gear in mesh therewith for finishing is rotated to rotate the other of said pinions.

4. A machine for finishing the teeth of a face gear comprising in combination, a support, pinions independently rotatable on aligned axes disposed transversely thereof, a slide reciprocable transversely on said support, a carrier reciprocable in said slide towards and away from said pinions having means in an end adjacent said pinions for rotatably supporting a gear to be finished on an axis transverse to that of the pinions so that the teeth thereof on opposite sides may mesh with said pinions, means for rotating one of said pinions, and means for urging said carrier towards said pinions.

5. A machine for finishing the teeth of a face gear comprising in combination, a support, pinion tools independently rotatable in said support on aligned axes, a slide reciprocable back and forth in the support in a plane parallel to said axes, a carrier reciprocable back and forth in said slide for supporting a face gear with its axis transverse to said axes and the teeth on opposite sides thereof in engagement with said pinions, reciprocating means for said slide, driving means for said reciprocating means and for one of said pinions, and a fly wheel associated with the other of said pinions, all adapted and arranged whereby said one of the pinions may be rotated to rotate a face gear supported by said support by which rotates said other pinion and said face gear moved axially of said pinion.

JULIAN L. PERKINS.